(12) United States Patent
Shin et al.

(10) Patent No.: US 11,030,926 B2
(45) Date of Patent: Jun. 8, 2021

(54) IMAGE DISPLAY APPARATUS CAPABLE OF MULTI-DEPTH EXPRESSION

(71) Applicant: SAMSUNG ELECTRONICS CO., LTD., Suwon-si (KR)

(72) Inventors: Bongsu Shin, Seoul (KR); Yuntae Kim, Suwon-si (KR); Geeyoung Sung, Daegu (KR); Changkun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/784,998

(22) Filed: Feb. 7, 2020

(65) Prior Publication Data

US 2021/0020081 A1   Jan. 21, 2021

(30) Foreign Application Priority Data

Jul. 18, 2019   (KR) .................. 10-2019-0087098

(51) Int. Cl.
*G09G 3/00* (2006.01)
*G02B 27/01* (2006.01)
*G09G 3/02* (2006.01)
*G02B 27/14* (2006.01)

(52) U.S. Cl.
CPC .......... *G09G 3/003* (2013.01); *G02B 27/0172* (2013.01); *G02B 27/0176* (2013.01); *G09G 3/02* (2013.01); *G02B 27/14* (2013.01); *G02B 2027/014* (2013.01); *G02B 2027/0134* (2013.01); *G02B 2027/0159* (2013.01)

(58) Field of Classification Search
None
See application file for complete search history.

(56) References Cited

U.S. PATENT DOCUMENTS

| 10,088,673 | B2 | 10/2018 | Xu |
| 10,379,612 | B1 * | 8/2019 | Bonnier ............... G06F 3/0304 |
| 2003/0020879 | A1 | 1/2003 | Sonehara |

(Continued)

FOREIGN PATENT DOCUMENTS

| JP | 8-234141 A | 9/1996 |
| KR | 100703930 A | 7/2002 |

(Continued)

OTHER PUBLICATIONS

Communication dated Oct. 27, 2020, issued by the European Patent Office in European Application No. 20172099.2.

(Continued)

*Primary Examiner* — Ryan M Gray
(74) *Attorney, Agent, or Firm* — Sughrue Mion, PLLC

(57) ABSTRACT

An image display apparatus includes a display device configured to modulate light to form an image; a driver configured to adjust a position of the display device; a light transmitter comprising a focusing member and configured to change a direction of the light incident on the light transmitter to transmit the image to a preset location; and a processor configured to generate a driving signal according to image information and control the driver according to the driving signal, to adjust the position of the display device relative to the focusing member according to the driving signal.

21 Claims, 13 Drawing Sheets

(56) References Cited

U.S. PATENT DOCUMENTS

| | | | |
|---|---|---|---|
| 2015/0153572 A1* | 6/2015 | Miao | G02B 27/017 |
| | | | 345/8 |
| 2016/0286177 A1 | 9/2016 | Border et al. | |
| 2016/0313558 A1* | 10/2016 | Gutierrez | G02B 27/0176 |
| 2018/0015876 A1 | 1/2018 | Yamagata et al. | |
| 2018/0275367 A1 | 9/2018 | Lim | |
| 2018/0275410 A1 | 9/2018 | Yeoh et al. | |
| 2019/0212546 A1* | 7/2019 | Sohn | G02B 26/0875 |
| 2019/0302479 A1* | 10/2019 | Smyth | G02B 26/06 |
| 2019/0353894 A1* | 11/2019 | Zhou | G06F 3/04847 |
| 2020/0125227 A1 | 4/2020 | Shin et al. | |
| 2020/0285310 A1* | 9/2020 | Sazuka | G02B 27/0093 |
| 2020/0371360 A1* | 11/2020 | Dalrymple | G02B 3/12 |

FOREIGN PATENT DOCUMENTS

| | | | |
|---|---|---|---|
| KR | 1020140077398 A | 6/2014 | |
| KR | 101592087 B1 | 8/2015 | |
| KR | 101626679 B1 | 6/2016 | |
| KR | 101670970 B1 | 11/2016 | |
| KR | 1020180107433 A | 10/2018 | |
| KR | 101917762 B1 | 1/2019 | |
| KR | 1020190010345 A | 1/2019 | |
| KR | 1020190033414 A | 3/2019 | |

OTHER PUBLICATIONS

International Search Report (PCT/ISA/210) dated Oct. 15, 2020 issued by the International Searching Authority in International appl'n. No. PCT/KR2020/009388.
Communication dated Jan. 27, 2021 issued by the European Patent Office in application No. 20172099.2.

* cited by examiner

IMAGE DISPLAY APPARATUS CAPABLE OF MULTI-DEPTH EXPRESSION

CROSS-REFERENCE TO RELATED APPLICATION

This application claims priority from Korean Patent Application No. 10-2019-0087098, filed on Jul. 18, 2019, in the Korean Intellectual Property Office, the disclosure of which is incorporated herein by reference in its entirety.

BACKGROUND

1. Field

Apparatuses and methods consistent with example embodiments relate to image display apparatuses capable of multi-depth expression.

2. Description of the Related Art 3-dimensional (3D) image display technology has been applied to various fields, and recently, has been applied to an image display apparatus related to a virtual reality (VR) display and an augmented reality (AR) display.

A VR head-mounted display is widely used in the media and entertainment industry as it becomes commercially available. In addition, the head-mounted display is developed into a form that may be applied in the medical, education, and industrial fields.

The AR display is an advanced form of the VR display, and combines the real world and VR to provide the feature of interacting between reality and VR. The interaction between reality and VR is based on a function of providing information about a real situation in real time, and may further increase an effect of reality by superimposing virtual objects or information on an environment of the real world.

In such apparatuses, stereoscopy technology is commonly used for a 3D image display, which may be accompanied by visual fatigue due to a vergence-accommodation mismatch. Accordingly, a 3D image display method capable of reducing visual fatigue has been sought.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide image display apparatuses capable of multi-depth expression.

According to an aspect of an example embodiment, there is provided an image display apparatus including: a display device configured to modulate light to form an image; a driver configured to adjust a position of the display device; a light transmitter comprising a focusing member and configured to change a direction of the light incident on the light transmitter to transmit the image to a preset location; and a processor configured to generate a driving signal according to image information and control the driver according to the driving signal, to adjust the position of the display device relative to the focusing member according to the driving signal.

The driver may be further configured to move the display device in parallel such that a distance between the display device and the focusing member varies.

The driver may include a shape-changing portion which is deformable according to an applied signal to provide a driving force to the display device.

The shape-changing portion may include a material that has a shape varying by heat.

The shape-changing portion may include a shape memory alloy or an electro active polymer.

The light transmitter may be further configured to transmit the image as an enlarged image on a virtual image plane at a predetermined position.

The image information may include depth information related to the predetermined position of the virtual image plane with respect to each of images of a plurality of frames, and the processor may be further configured to generate the driving signal according to the depth information.

The depth information may be information previously set from a saliency map with respect to each of the images of the plurality of frames.

The processor may be further configured to generate a scale factor to be applied to any one of images of two successive frames with different depth information, generate a light modulation signal by reflecting the scale factor to the image information, and control the display device according to the light modulation signal.

The processor may be further configured to compute magnifications at which the images of the two successive frames are respectively imaged, and set the scale factor to 1 when a change value between the magnifications is equal to or less than a predetermined reference value.

The processor may be further configured to compute magnifications at which the images of the two successive frames are respectively imaged, and determine a similarity of the images of the two frames when the change value between the magnifications is larger than the predetermined reference value.

The processor may be further configured to set the scale factor to 1 when the similarity of the images of the two successive frames is equal to or less than the predetermined reference value, and set the scale factor to an offset value that offsets the change value when the similarity of the images of the two successive frames is larger than the predetermined reference value.

The processor may be further configured to, with respect to an image of a same frame, transmit the driving signal when a predetermined time elapses since the light modulation signal is transmitted.

The predetermined time may be set to be equal to or greater than a predetermined convergence-accommodation time of an eye.

The light transmitter may be further configured to combine a first light comprising a first image from the display device with a second light comprising a second image of a real environment and transmit a combination of the first light and the second light to the preset location.

The light transmitter may include a beam splitter disposed obliquely with respect to a traveling path of the first light and a traveling path of the second light and the focusing member.

The beam splitter may be a half mirror.

The display device may include a first display device and a second display device, the driver may include a first driver and a second driver respectively configured to drive the first display device and the second display device such that positions of the first display device and the second display device vary, and the light transmitter may include a first light transmitter and a second light transmitter configured to transmit images formed by the first display device and the second display device to a preset left eye location and a preset right eye location, respectively.

The image information may include information about a pair of left eye image and right eye image to be perceived as a three-dimensional (3D) image of one frame, and the processor may be further configured to control the first display device and the second display device such that the left eye image is formed by the first display device and the right eye image is formed by the second display device.

The image information may further include depth information related to positions of a virtual image plane on which the left eye image and the right eye image are to be imaged, and the processor may be further configured to control the first driver and the second driver according to the depth information.

The image display apparatus may be a wearable apparatus.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
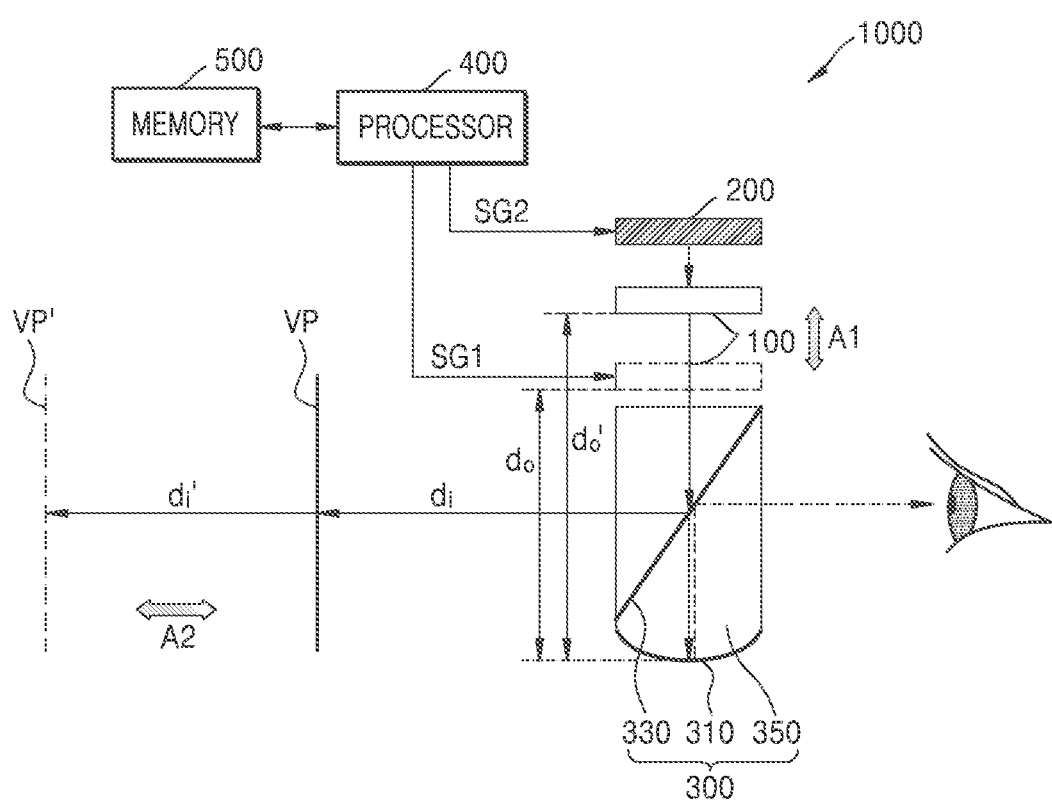
FIG. 1 is a diagram illustrating a configuration and an optical arrangement of an image display apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, when a constituent element is disposed "above" or "on" to another constituent element, the constituent element may be only directly on the other constituent element or above the other constituent elements in a non-contact manner.

The expression of singularity in the present specification includes the expression of plurality unless clearly specified otherwise in context. Also, terms such as "comprise" and/or "comprising" may be construed to denote a constituent element, but may not be construed to exclude the existence of or a possibility of addition of another constituent element.

The use of the terms "a" and "an" and "the" and similar referents in the context of describing the disclosure (especially in the context of the following claims) are to be construed to cover both the singular and the plural.

Also, operations of all methods described herein may be performed in any suitable order unless otherwise indicated herein or otherwise clearly contradicted by context. The present disclosure is not limited to the described order of the operations. The use of any and all examples, or language (e.g., "such as") provided herein, is intended merely to better illuminate the disclosure and does not pose a limitation on the scope of the disclosure unless otherwise claimed.

Figure 2:
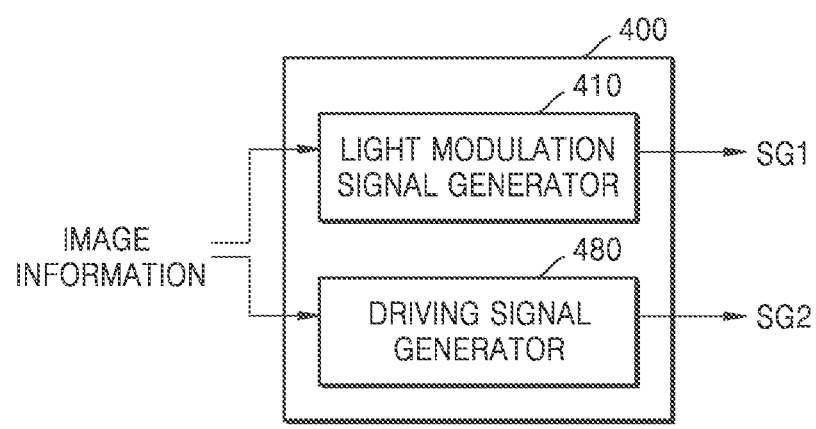
FIG. 2 is a block diagram illustrating an example of a configuration of a processor that may be employed in the image display apparatus of FIG. 1.

FIG. 1 is a diagram illustrating a configuration and an optical arrangement of an image display apparatus 1000 according to an example embodiment, and FIG. 2 is a block diagram illustrating an example of a configuration of a processor 400 that may be employed in the image display apparatus 1000 of FIG. 1.

The image display apparatus 1000 includes a display device 100 that modulates light to form an image, a driver 200 that drives the display device 100 such that a position of the display device 100 varies, a light transmitter 300 that transmits an image formed by the display device 100 to an observer's eyes, for example by changing the direction of a light incident from the display device 100 to a preset location (e.g., a preset location of the observer's eyes), and the processor 400 that controls the display device 100 and the driver 200 according to image information.

The display device 100 modulates the light according to the image information of the image to be provided to an observer to form the image. The image formed by the display device 100 may be provided to both eyes of the observer, and for convenience, only an optical system toward one eye is shown in FIG. 1. The image formed by the display device 100 may be, for example, a stereo image provided to each of the left and right eyes of the observer, a hologram image, a light field image, an integral photography (IP) image, etc., and may include a multi-view or super multi-view image. In addition, the image is not limited thereto and may be a general two-dimensional (2D) image.

The display device 100 may include, for example, a liquid crystal on silicon (LCoS) device, a liquid crystal display (LCD) device, an organic light emitting diode (OLED) display device, and a digital micromirror device (DMD), and also may include next-generation display devices such as a micro LED, a quantum dot LED, etc.

Although not illustrated in the image display apparatus 1000, a light source that provides the light for forming the image may be provided in the display device 100, and a configuration such as a beam splitter for adjusting an optical path, a relay lens for enlarging or reducing the image, a spatial filter for noise removal, etc. may be further provided.

The light transmitter 300 changes a path of the image formed by the display device 100, forms the image of a size suitable for the observer's field of vision, and transmits the image to the observer's eye. The light transmitter 300 may include a focusing member 310 and may also include a beam splitter 330 as a member for diverting the light to change the path.

The focusing member 310 may include an image forming member having a refractive power and may enlarge or reduce the image formed by the display device 100. The focusing member 310 is shown as a concave mirror, but is not limited thereto. The focusing member 310 may have a combination shape of a concave mirror, a convex lens, a concave lens, etc.

The beam splitter 330 may include a half mirror that transmits half of an incidence light and reflects the other half thereof. However, the beam splitter 330 is not limited thereto and may include a polarizing beam splitter that transmits or reflects the incidence light according to polarization. When the beam splitter 330 may include a polarizing beam splitter, additional optical elements for polarization conversion may be further provided in the light transmitter 300.

As shown, the focusing member 310 and the beam splitter 330 are fixed through a transparent light guide member 350 such that the light transmitter 300 may have an integral structure. However, this is an example and is not limited thereto.

The light transmitter 300 may transmit the light including the image formed by the display device 100 to the observer's eye, and may also transmit the light including a real environment image of the front of the observer. Accordingly, the image display apparatus 1000 may function as a see-through type display.

The light transmitter 300 is not limited to the illustrated shape and configuration. An additional optical element may be further provided so as to transmit the image formed by the display device 100 to an observer's pupil along with the real environment image of the front of the observer, and optical windows having various shapes and structures may be employed.

The light of the image formed by the display device 100 reaches the observer's eye along a path such that the light passes through the beam splitter 330 and is reflected by the focusing member 310 and then reflected by the beam splitter 330. In this path, the observer recognizes a virtual image formed on a virtual image plane VP at a predetermined position of the rear of the beam splitter 330, and a sense of depth sensed by the observer varies depending on the position of the virtual image plane VP. In FIG. 1, the light reflected from the focusing member 310 is illustrated as a dashed line positioned apart from a solid line indicating the light incident on the focusing member 310, but the reflected light may travel to the beam splitter 330 in the same path in which the light is incident on the focusing member 310 from the display device 100, and the dashed line and the solid line can be considered as being positioned to overlap with each other.

The image display apparatus 1000 according to an example embodiment may not fix the position of the virtual image plane VP to one fixed position but may change the position of the virtual image plane VP by reflecting the sense of depth of the image to be displayed. To this end, the image display apparatus 1000 includes the driver 200 for driving the position of the display device 100. The driver 200 may move the display device 100 in parallel such that a distance between the driver 200 and the focusing member 310 varies. When the position of the display device 100 varies in an A1 direction, the position of the virtual image plane VP varies in an A2 direction.

The driver 200 may include a shape-changing material in order to widen the position driving range of the display device 100 in a volume as small as possible. In particular, the driver 200 may be deformed according to an applied signal (e.g., a voltage or heat applied to the driver 200) and provide driving force to the display device 100. For such shape variation, a material of which a shape varies by heat may be employed in the driver 200. The driver 200 may include a shape memory alloy (SMA) or an electro active polymer (EAP). An example of a detailed configuration of varying the position of the display device 100 by driving the driver 200 will be described later with reference to FIGS. 6 to 11. The driver 200 may be implemented as an actuator The processor 400 may generate and transmit a light modulation signal SG1 to the display device 100, and may generate and transmit a driving signal SG2 to the driver 200 according to image information related to an image to be perceived by the observer. The display device 100 and the driver 200 are controlled by the generated light modulation signal SG1 and the driving signal SG2, respectively. That is, the image is formed on the display device 100 by the light modulation signal SG1, and the position of the display device 100 is driven such that the virtual image plane VP set appropriately in accordance with the image is located.

The image display apparatus 1000 may also include a memory 500 and may store various data and codes of programs necessary for driving the image display apparatus 1000 in the memory 500 including the image information.

The processor 400 may include a light modulation signal generator 410 and a driving signal generator 480. The light modulation signal SG1 and the driving signal SG2 are generated by the light modulation signal generator 410 and the driving signal generator 480, respectively, with reference to the image information.

The image information may include data for each pixel related to color values of a plurality of pixels with respect to each of images of a plurality of frames to be provided to the observer, and include depth information related to the position of the virtual image plane VP on which each image is imaged.

The depth information included in the image information may be a previously determined representative depth value with respect to each of the images of the plurality of frames. This depth value may be set to one or more values. For example, when an image includes a plurality of objects (e.g., object 1, an object 2, and object 3), depth information (e.g., a first depth value of object 1, a second depth value of object 2, and a third depth value of object 3) of each of the plurality of objects may be stored in the memory 500.

The representative depth may be previously set from a salience map. A saliency map analysis may be performed to select a region that is highly likely to be viewed by the observer, that is, a region having a high visual concentration. Brightness, color, outline, object size, etc. may be considered to select the region having high visual concentration. For example, a region having a great difference in brightness or color, a region having a strong outline feature, and a region having a large size of an object compared to the surroundings may be areas of high visual concentration. A depth value corresponding to this region may be selected as the representative depth. Alternatively, a position with high visual concentration may be selected according to contents included in the image.

In addition, the representative depth may be set according to, for example, a frequency of each depth by analyzing a depth map and a color map of the image. Alternatively, the representative depth may be set through a zone of comfort (ZOC) analysis considering human visual perception characteristics.

The representative depth set as described above may be a successive value or may be a plurality of discrete values. That is, not all of values necessary for depth representation are used, but the representative depth may be set among discrete values obtained by quantizing these values at predetermined intervals. In the case of quantizing the depth value, when the representative depth value is selected for every frame for moving image representation, a variation of the representative depth value selected in successive frames may be reduced. Accordingly, the position variation of the display device 100 by the driver 200 may be reduced, and when the position of the virtual image plane VP changes in correspondence to the representative depth, the driving signal SG2 applied to the driver 200 may also be quantized and may be easily driven. When the same representative depth value is selected in the successive frames, the position driving of the display device 100 is not necessary, and thus, driving of the image display apparatus 1000 may be further simplified.

The light modulation signal generator 410 may generate an electric signal indicating the color value determined with reference to the data for each pixel included in the image information as the light modulation signal SG1.

The driving signal generator 480 may generate the driving signal SG2 for moving the position of the display device 100 such that the virtual image plane VP is formed on a position corresponding to the representative depth value set with reference to the depth information. The driving signal SG2 may be, for example, an electrical signal that generates heat suitable for deformation of the variable material of the driver 200.

The light modulation signal SG1 and the driving signal SG2 may be transmitted to the display device 100 and the driver 200, respectively, such that the corresponding image may be perceived by the observer from a changed position of the virtual image plane VP.

The processor 400 may transmit the light modulation signal SG1 and the driving signal SG2 at different times. For example, the processor 400 may transmit the driving signal SG2 to the driving signal SG2 at a first point in time which is subsequent to a second point in time at which the processor 400 transmits the light modulation signal SG1 to the display device 100. The time interval between the first point in time and the second point in time may be a predetermined time interval, and may be set to be equal to or greater than a convergence-accommodation time of the observer's eye. This takes into account the time it takes for the human eye to perceive an image of a changed depth position.

Figure 3:
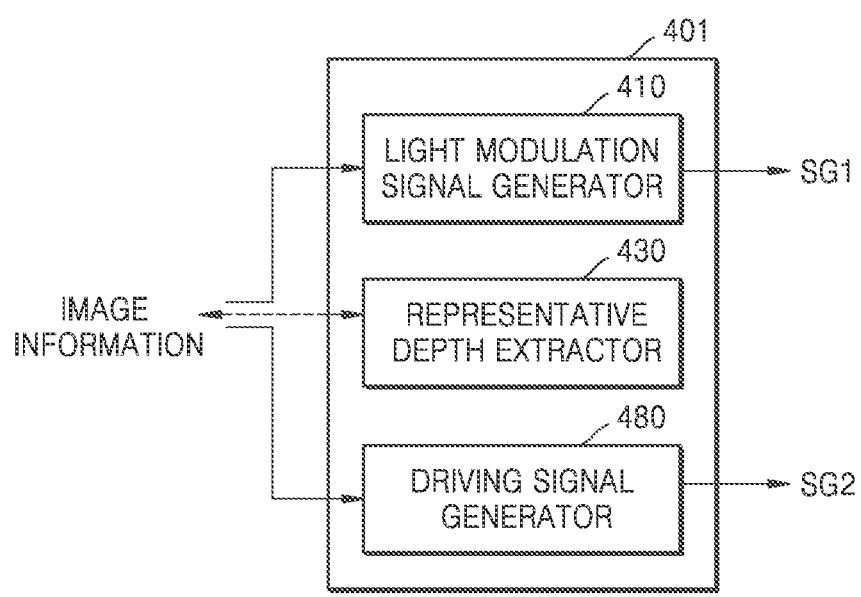
FIG. 3 is a block diagram illustrating another example of a configuration of a processor that may be employed in the image display apparatus of FIG. 1.

FIG. 3 is a block diagram illustrating another example of a configuration of a processor 401 that may be employed in the image display apparatus 1000 of FIG. 1.

The processor 401 may further include a representative depth extractor 430 together with the light modulation signal generator 410 and the driving signal generator 480.

In the description of FIG. 2, the image information is described as including previously set depth information, but is not limited thereto. The processor 401 may include the representative depth extractor 430. That is, the processor 401 extracts a representative depth for each image with reference to data for each pixel included in the image information and reflects the representative depth to the image information again. Referring to this, the driving signal generator 480 may generate the driving signal SG2.

Figure 4:
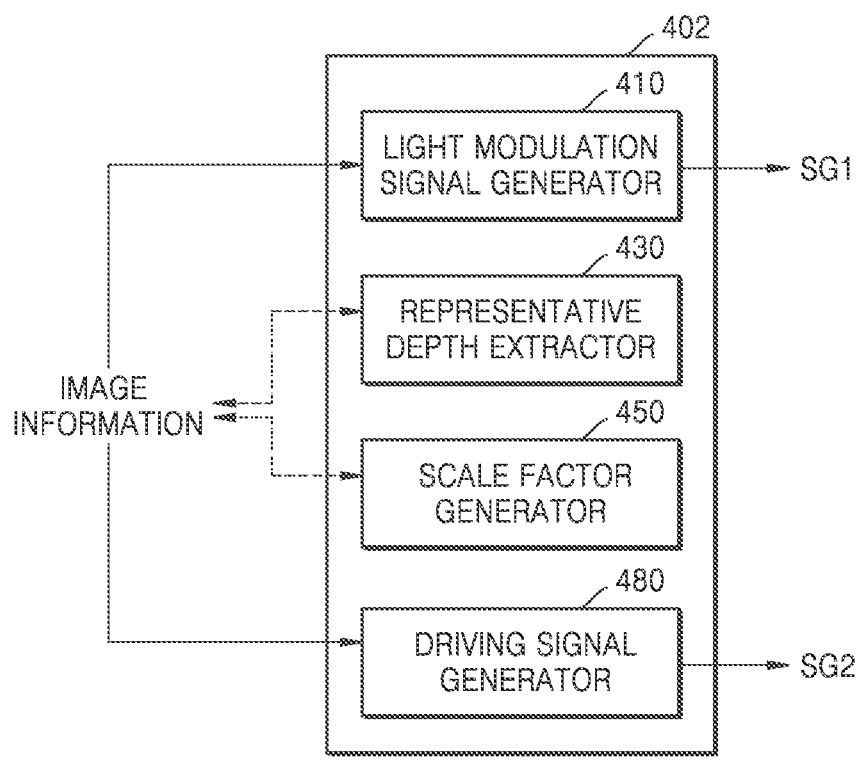
FIG. 4 is a block diagram illustrating another example of a configuration of a processor that may be employed in the image display apparatus of FIG. 1.
Figure 5:
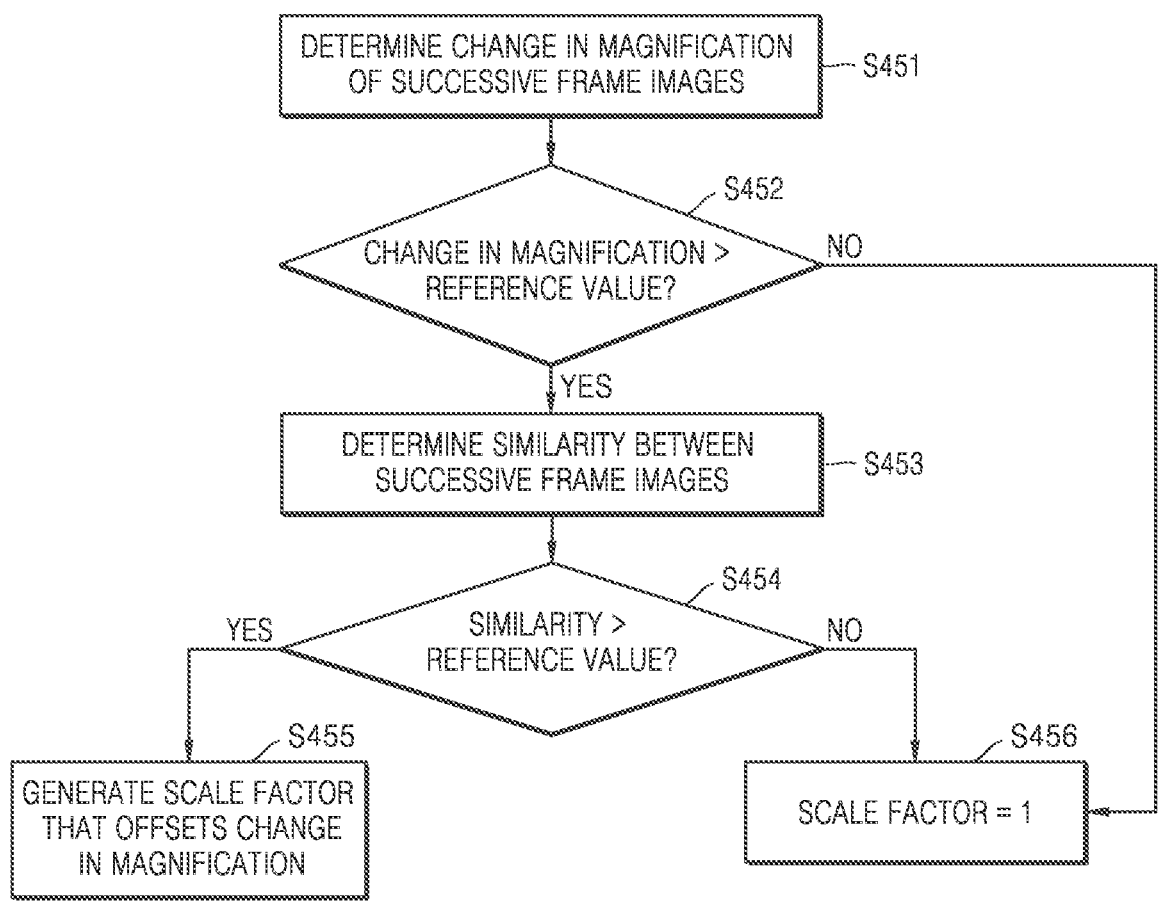
FIG. 5 is a flowchart illustrating an example of an operation of a scale factor generator included in the processor of FIG. 4.

FIG. 4 is a block diagram illustrating another example of a configuration of a processor 402 that may be employed in the image display apparatus 1000 of FIG. 1, and FIG. 5 is a flowchart illustrating an example of an operation of a scale factor generator 450 included in the processor 402 of FIG. 4.

The processor 402 may further include the scale factor generator 450 in addition to the light modulation signal generator 410, the driving signal generator 480, and the representative depth extractor 430.

The scale factor generator 450 generates a scale factor to be applied to any one of images of two consecutive frames having different depth information.

The processor 402 may operate the scale factor generator 450 to generate a scale factor when the images of the two consecutive frames have different virtual image planes VPs, and therefore the images of the two consecutive frames may exhibit different magnifications.

A magnification m is defined as follows.

$$\frac{d_i}{d_o} = \frac{\text{image distance}}{\text{object distance}} = m \text{ (magnification)}$$

wherein, $d_o$ denotes a distance from an image display surface of the display device 100 to the focusing member 310, and $d_i$ denotes a distance from the focusing member 310 to the virtual image plane VP. $d_i$ denotes a distance along an virtual light path, and the indicated distances $d_i$ and $d_i'$ include a distance from the center of the focusing member 310 to the center of the beam splitter 330 and a distance from the center of the beam splitter 330 to the virtual image plane VP.

When $d_o$ and $d_i$ are determined according to a position of the display device 100 and a position of the virtual image plane VP and the magnification at this time is m, a magnification m' corresponding to a changed position of the virtual image plane VP is $d_i'/d_o'$, which is different from m. This change in the magnification in the successive frame images may be felt to be awkward to an observer. In order to form a more natural sense of depth, the processor 402? may form an image on the display device 100 by reflecting the scale factor that may offset the change in the magnification to the image information.

The scale factor does not have to be applied to all successive frame images having different magnifications, and may be applied when a magnification change value is larger than a predetermined reference value. In addition, even when the magnification change value is large, the application of the scale factor may not be required for images of other scenes which are not related to each other. Considering this situation, the scale factor may be set and applied.

Referring to FIG. 5, in order to generate the scale factor, the scale factor generator 450 determines the change in the magnification of the images of the two consecutive frames, in operation S451. That is, the scale factor generator 450 computes magnifications m1 and m2 of the images of the two consecutive frames, respectively, and calculates a change value. The change value may be defined, for example, as a ratio m2/m1 or a difference m2-m1.

Next, the scale factor generator 450 compares the calculated change value between the two magnifications m1 and m2 with a predetermined reference value, in operation S452.

If the change value between the two magnifications m1 and m2 is less than or equal to the predetermined reference value, the scale factor generator 450 sets the scale factor to 1, in operation S456.

Otherwise, when the change value between the two magnifications m1 and m2 is larger than the predetermined reference value, the scale factor generator 450 determines a similarity of the images of the two frames, in operation S453. In order to determine the similarity of the images, a numerical value defined according to a predetermined determination reference may be compared. The numerical value is referred to as the similarity. The similarity may be defined based on a pixel value, or may be defined by other reference suitable for image comparison.

Even when the change in the magnification is large, the scale factor may not be applied with respect to an unrelated scene. This is because an observer may feel the change in the magnification naturally as part of a scene change. When the similarity of the compared images of the two frames is equal to or less than a predetermined reference value, the scale factor generator 450 may set the scale factor to 1, in operation S456.

When the similarity of the compared images of the two frames is larger than the predetermined reference value, the scale factor generator 450 may generate the scale factor that offsets the magnification change value, in operation S455. For example, when the change value is set as a ratio, the scale factor may be set to a value inversely proportional to the magnification change value.

As such, the scale factor set by the scale factor generator 450 is reflected to the image information again, and the light modulation signal generator 410 generates a light modulation signal with reference thereto.

As described with reference to FIG. 3, the representative depth extractor 430 may set the representative depth from the image information and reflect the representative depth to the image information as depth information. Referring to the representative depth, the driving signal generator 480 may generate the driving signal SG2.

The processor 402 illustrated in FIG. 4 includes the representative depth extractor 430 together with the scale factor generator 450 but this is an example. However, the processor 402 may omit the representative depth extractor 430 and the scale factor generator 450 together. For example, a representative depth set by another processor or the like may be previously included in the image information as the depth information. In addition, the scale factor may be set by another processor or the like and previously included in the image information.

Figure 6:
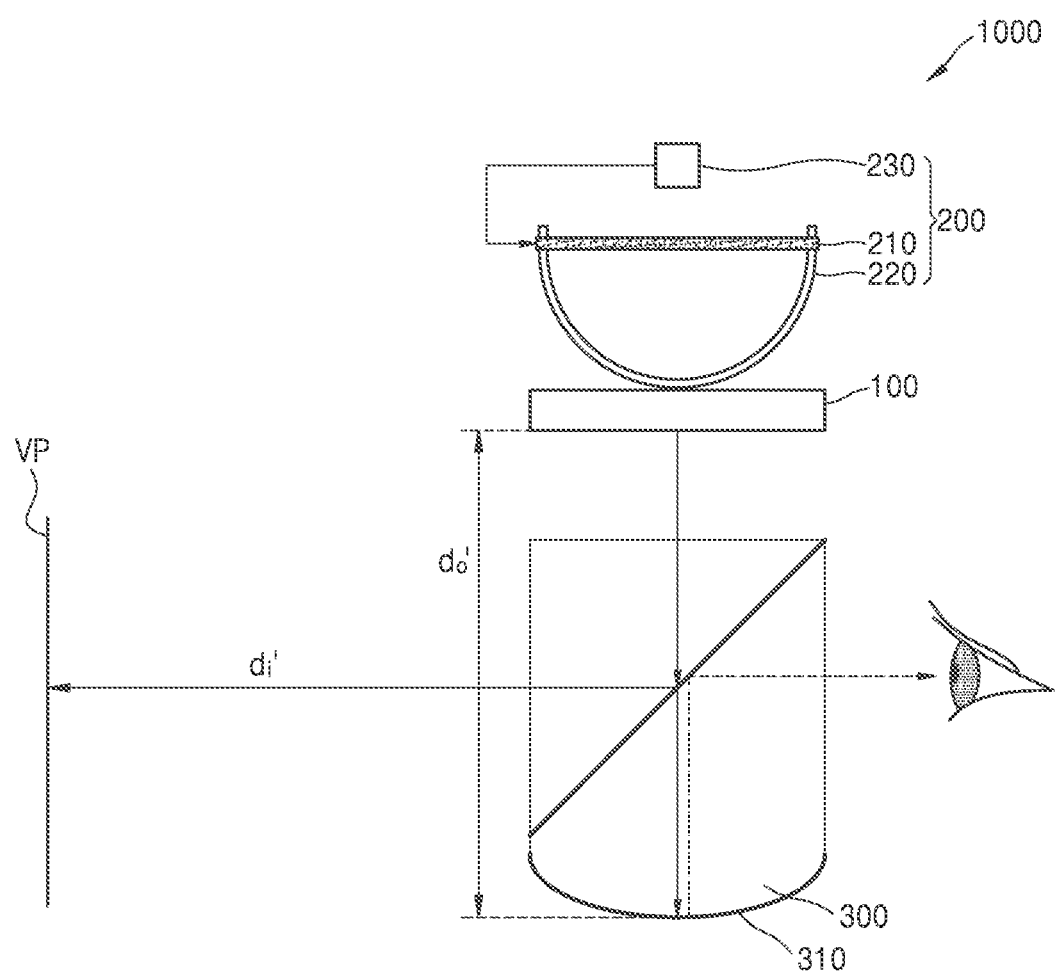
FIGS. 6 and 7 illustrate an example that a display device and image plane positions change according to deformation of a driver together with an example of a structure of the driver in the image display apparatus of FIG. 1.
Figure 7:
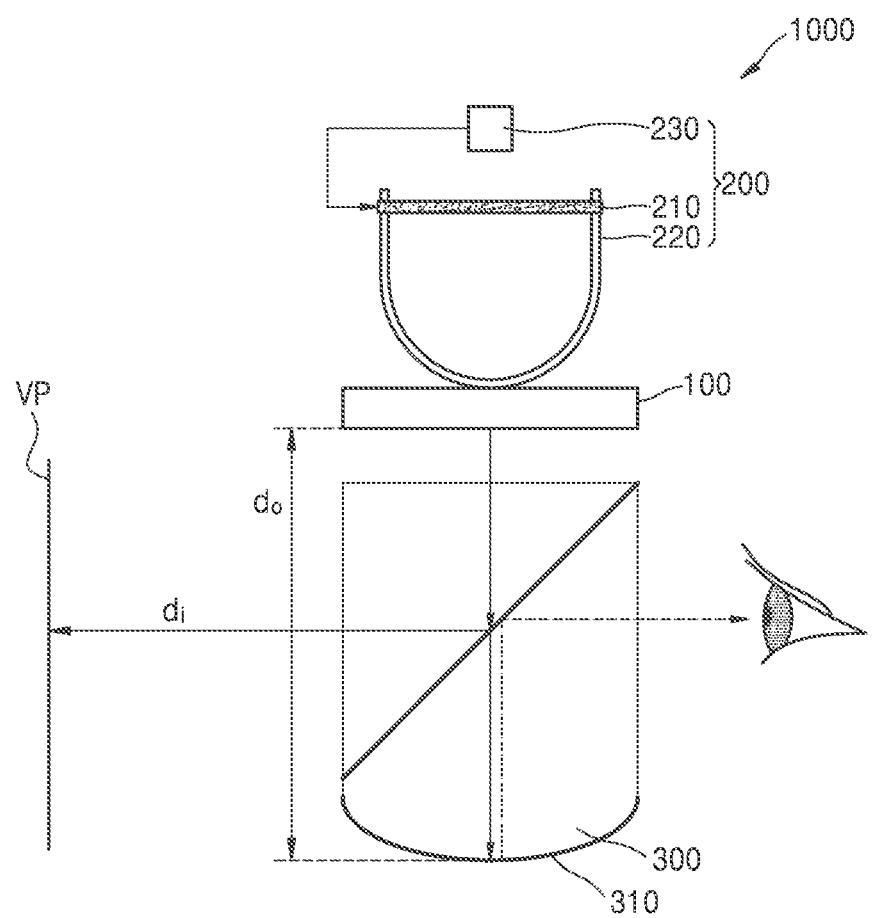
Figure 8:
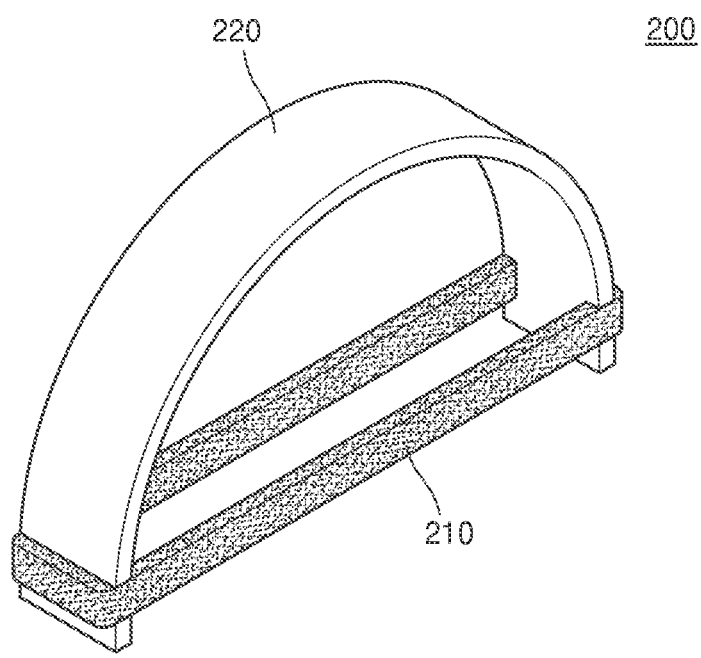
FIG. 8 is a perspective view illustrating a detailed shape of the driver of FIGS. 6 and 7.

FIGS. 6 and 7 illustrate an example that the display device 100 and the image plane positions change according to deformation of the driver 200 together with an example of a structure of the driver 200 in the image display apparatus 1000 of FIG. 1. FIG. 8 is a perspective view illustrating a detailed shape of the driver 200 of FIGS. 6 and 7.

Referring to FIGS. 6 and 7, the driver 200 may include a deformation portion 210, a bridge portion 220, and a driving controller 230. The deformation portion 210 may have a wire shape. The length of the deformation portion 210 may vary depending on the temperature of the deformation portion 210 or an electric field formed in the deformation portion 210. For example, the deformation portion 210 may include a shape memory alloy (SMA), an electro-active polymer (EAP), and a combination thereof. When the deformation portion 210 includes an SMA, the deformation portion 210 may have a relatively short length at a relatively high temperature and may have a relatively long length at a relatively low temperature. For example, the length of the deformation portion 210 may increase as the temperature of the deformation portion 210 decreases, and the length of the deformation portion 210 may decrease as the temperature of the deformation portion 210 increases. When the deformation portion 210 includes an EAP and when the electric field is applied to the deformation portion 210, the length of the deformation portion 210 may increase in a direction perpendicular to the applied electric field. Hereinafter, an example that the deformation portion 210 is deformed by the temperature will be described.

As shown in FIG. 8, the bridge portion 220 includes a plate shape member extending in one direction and provided with recess regions facing each other at both ends. The recess regions may be used to fixate deformation portion 210 at the ends of the bridge portion 220, and may be also referred to as the term "depressions" or "grooves." The bridge portion 220 may have elasticity and may be bent by the deformation portion 210 to have an arch shape. The deformation portion 210 may be fitted into the recess regions of the bridge portion 220 and may have a shape surrounding an end of the bridge portion 220. When the deformation portion 210 be wound around the recess regions of both ends of the bridge portion 220, the recess regions of the bridge portion 220 fix the deformation portion 210, and thus, positions of the deformation portion 210 and the bridge portion 220 may be aligned.

The temperature of the deformation portion 210 may be adjusted by an electrical signal applied to the deformation portion 210. The electrical signal may be applied by the driving controller 230. The driving controller 230 may include a voltage supply, a current supply, or a power supply to generate the electrical signal. The driving controller 230 may apply the electrical signal to the deformation portion 210 according to the driving signal SG2 transmitted from the processor 400. The electrical signal may be a current signal or a voltage signal. The temperature of the deformation portion 210 may change according to a value of the voltage signal or the current signal that is applied to the deformation portion 210. For example, the driving controller 230 applies a current to the deformation portion 210 to increase the temperature of the deformation portion 210. When the driving controller 230 stops applying current to the deformation portion 210, the temperature of the deformation portion 210 may be lowered. As such, the driving controller 230 may apply heat to the deformation portion 210 by using an electrical signal, so that the temperature of the deformation portion 210 may change as a result of the supply of heat.

A degree of bending of the bridge portion 220 may vary according to a change in the length of the deformation portion 210. When the length of the deformation portion 210 decreases, the degree of bending of the bridge portion 220 may increase. Accordingly, a distance between the display device 100 and the focusing member 310 may decrease. When the length of the deformation portion 210 increases, the degree of bending of the bridge portion 220 may be reduced. Accordingly, the distance between the display device 100 and the focusing member 310 may increase. Here, the term "degree of bending" may be also referred to as "degree of curve" or "degree of curvature."

Referring to FIG. 6, the driving controller 230 may not apply a current to the deformation portion 210. In this state, the display device 100 may be spaced apart from the focusing member 310 by the distance V, and a distance on an optical path from the focusing member 310 to the virtual image plane VP may be $d_i'$.

Referring to FIG. 7, the current may be applied to the deformation portion 210 to increase the temperature of the deformation portion 210. The current may be applied by the driving controller 230. Accordingly, the length of the deformation portion 210 may decrease. The temperature of the deformation portion 210 may be controlled such that a degree of change in the length of the deformation portion 210 may be adjusted.

When the length of the deformation portion 210 decreases, the degree of bending of the bridge portion 220 may increase. In this deformation process, the bridge portion 220 may push the display device 100 toward the light transmitter 300 to place the display device 100 close to the light transmitter 300. The distance between the display device 100 and the focusing member 310 may decrease to $d_o$, and the distance between the virtual image plane VP and the focusing member 310 may decrease to $d_i$.

Referring back to FIG. 6, when the driving controller 230 stop applying current to the deformation portion 210 again, the temperature of the deformation portion 210 may be lowered and the length thereof may increase again. The degree of bending of the bridge portion 220 may be reduced. The distance between the display device 100 and the focusing member 310 may increase again to $d_o'$ and the distance between the virtual image plane VP and the focusing member 310 may increase again to $d_i'$.

Figure 9:
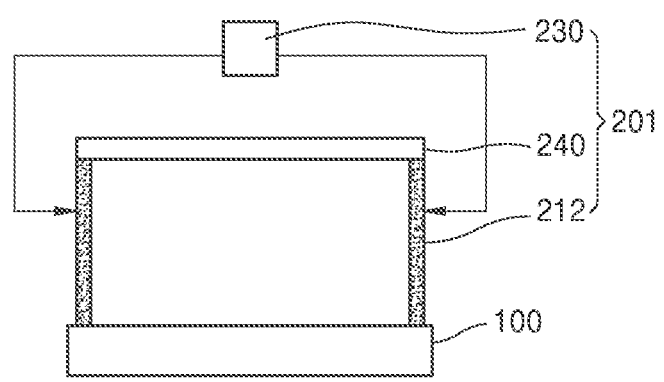
FIG. 9 illustrates an example of a configuration of a driver that may be employed in the image display apparatus of FIG. 1.
Figure 10:
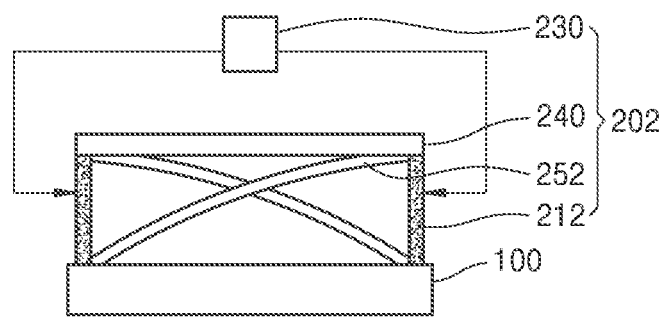
FIG. 10 illustrates another example of a configuration of a driver that may be employed in the image display apparatus of FIG. 1.
Figure 11:
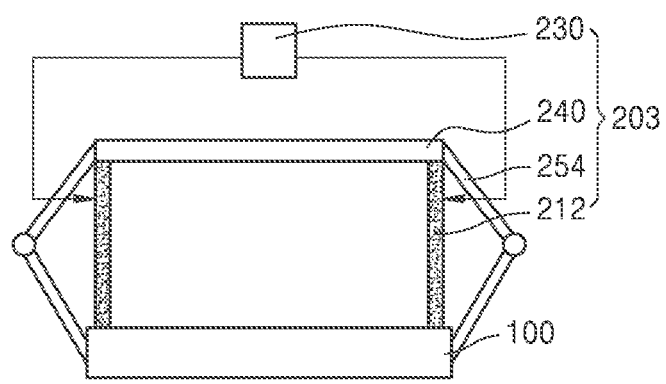
FIG. 11 illustrates another example of a configuration of a driver that may be employed in the image display apparatus of FIG. 1.

FIGS. 9 to 11 illustrate examples of configurations of drivers 201, 202, and 203 that may be employed in the image display apparatus 1000 of FIG. 1.

Referring to FIG. 9, the driver 201 may include deformation portions 212, a support portion 240, and the driving controller 230. Each of the deformation portions 212 may be substantially the same as the deformation portion 210 described with reference to FIG. 8 except for a position and a shape thereof.

The deformation portions 212 may be disposed between the support portion 240 and the display device 100. Both ends of each of the deformation portions 212 may be in contact with the support portion 240 and the display device 100, respectively. A pair of deformation portions 212 is shown, but this is an example. In other example embodiments, one deformation portion 212 or three or more deformation portions 212 may be provided.

The driving controller 230 may be electrically connected to the deformation portions 212 to apply an electrical signal to each of the deformation portions 212. For example, the driving controller 230 may apply a current to the deformation portions 212.

When the electrical signal is applied to the deformation portions 212 and the temperature of each of the deformation portions 212 increases, the length of each of the deformation portions 212 may decrease. In this case, the display device 100 is closer to the support portion 240, that is, a distance from the display device 100 to the focusing member 310 increases.

By controlling the temperature of each of the deformation portions 212, a degree of change in the length of each of the deformation portions 212 may be adjusted and the distance between the display device 100 and the focusing member 310 may be controlled.

Referring to FIG. 10, the driver 202 may include the deformation portions 212, the support portion 240, restoration portions 252, and the driving controller 230. The deformation portions 212, the support portion 240, and the driving controller 230 may be substantially the same as those described with reference to FIG. 9.

The restoration portions 252 may be provided between the support portion 240 and the display device 100. The restoration portions 252 may extend in a direction from the support portion 240 to the display device 100. The restoration portions 252 may extend to cross each other. Both ends of each of the restoration portions 252 may be in contact with the support portion 240 and the display device 100, respectively. The restoration portions 252 may have elasticity. For example, each of the restoration portions 252 may include a rod including carbon. When the restoration portions 252 are bent, the restoration portions 252 may have a restoring force to be restored to a state before bent again.

When an electrical signal is applied to the deformation portions 212, the temperature of each of the deformation portions 212 increases, the length of each of the deformation portions 212 decreases, and the restoration portions 252 are bent. Accordingly, the display device 100 receives a driving force moving toward the support portion 240, and the distance between the display device 100 and the focusing member 310 increases. The temperature of the deformation portions 212 may be controlled such that the degree of change in the length of each of the deformation portions 212 may be adjusted, and the distance between the display device 100 and the focusing member 310 may be controlled.

The restoration portions 252 have the restoring force, and thus, when the electrical signal stops being applied, the restoration portions 252 may be restored to the original state according to an increase in the length of each of the deformation portions 212. The restoring force may act in a direction in which a distance between the display device 100 and the support portion 240 increases, and accordingly, the distance between the display device 100 and the focusing member 310 may decrease.

Referring to FIG. 11, the driver 203 may include deformation portions 212, the support portion 240, restoration portions 254, and the driving controller 230. The deformation portions 212, the support portion 240, and the driving controller 230 may be substantially the same as those described with reference to FIG. 9.

The restoration portions 254 may be provided between the support portion 240 and the display device 100. The restoration portions 254 may include a torsion spring. When the restoration portions 254 are twisted, the restoration portions 254 may have a restoring force to be restored to a state before twisted. Both ends of each of the restoration portions 254 may be in contact with the support portion 240 and the display device 100, respectively.

When the electrical signal is applied to the deformation portions 212, the temperature of each of the deformation portions 212 may increase, the length of each of the deformation portions 212 may decrease, and the display device 100 and the support portion 240 may be close to each other. As the display device 100 and the support portion 240 are close to each other, the restoration portions 254 may be twisted. Accordingly, the display device 100 is far away from the focusing member 310. For example, the display device 100 may be positioned to be apart from the focusing member 310 by a distance greater than a predetermined minimum distance. By controlling the temperature of each of the deformation portions 212, the degree of change in the length of each of the deformation portions 212 may be adjusted and the distance between the display device 100 and the focusing member 310 may be controlled.

The restoration portions 254 have a restoring force that causes the restoration portions 254 to return to an initial state, and thus, when the electric signal stops being applied, the restoration portions 254 may be restored to the original state according to an increase in the length of the deformation portions 212. The restoring force may act in a direction in which the distance between the display device 100 and the support portion 240 increases. Accordingly, the distance between the display device 100 and the focusing member 310 may decrease.

As described above, the drivers 200, 201, 202, and 203 that may be provided in the image display apparatus 1000 according to the example embodiment may employ a shape-changing material to have a small volume and increase a position driving range of the display device 100. The driving range of the display device 100 may be within about 1 mm. When the driving range is implemented by, for example, a voice coil motor, a piezo actuator, or the like, a volume increase is very large, whereas in the example embodiment, the driving range may be implemented with a volume smaller than these.

Figure 12:
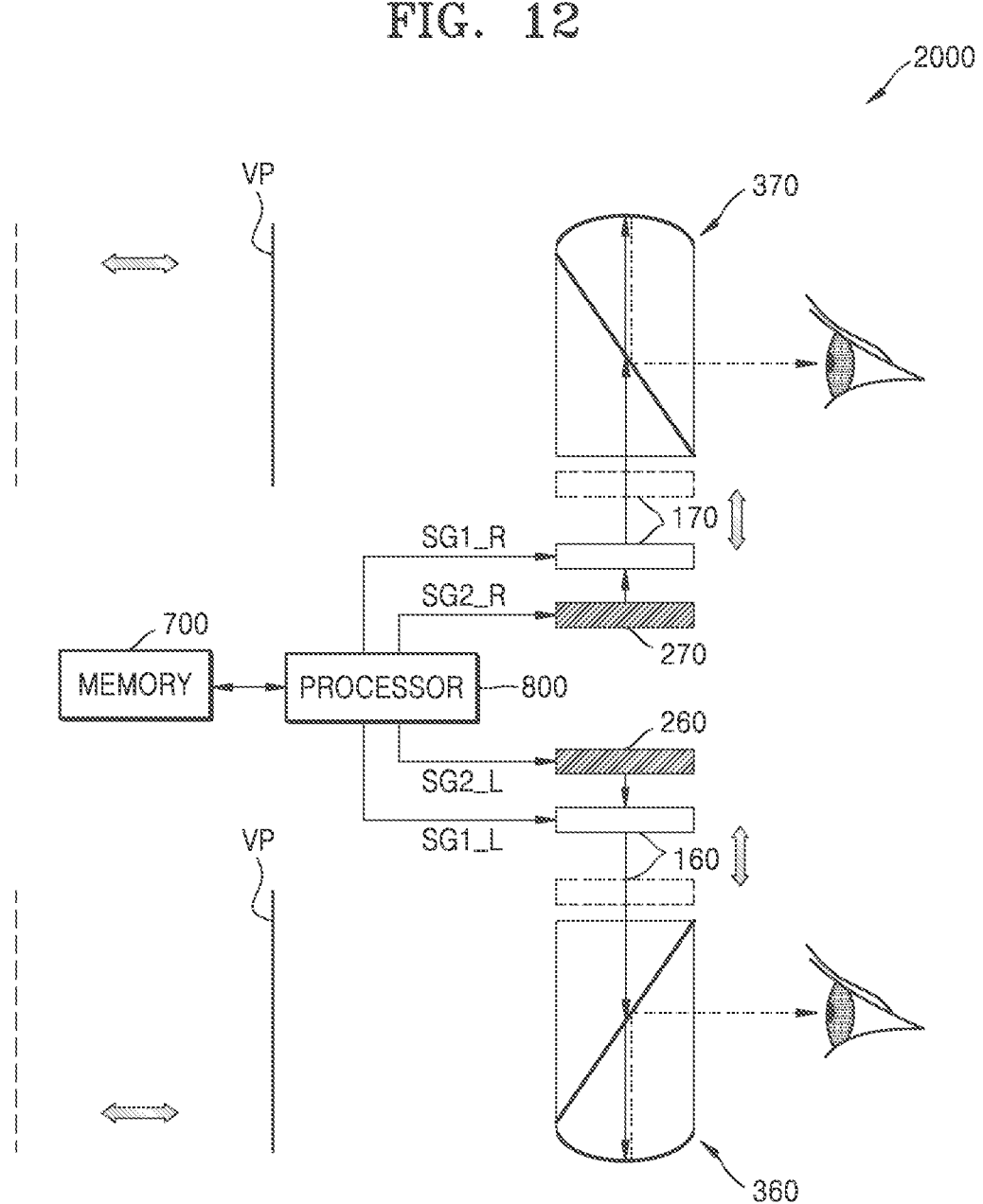
FIG. 12 illustrates a configuration and an optical arrangement of an image display apparatus according to another example embodiment.
Figure 13:
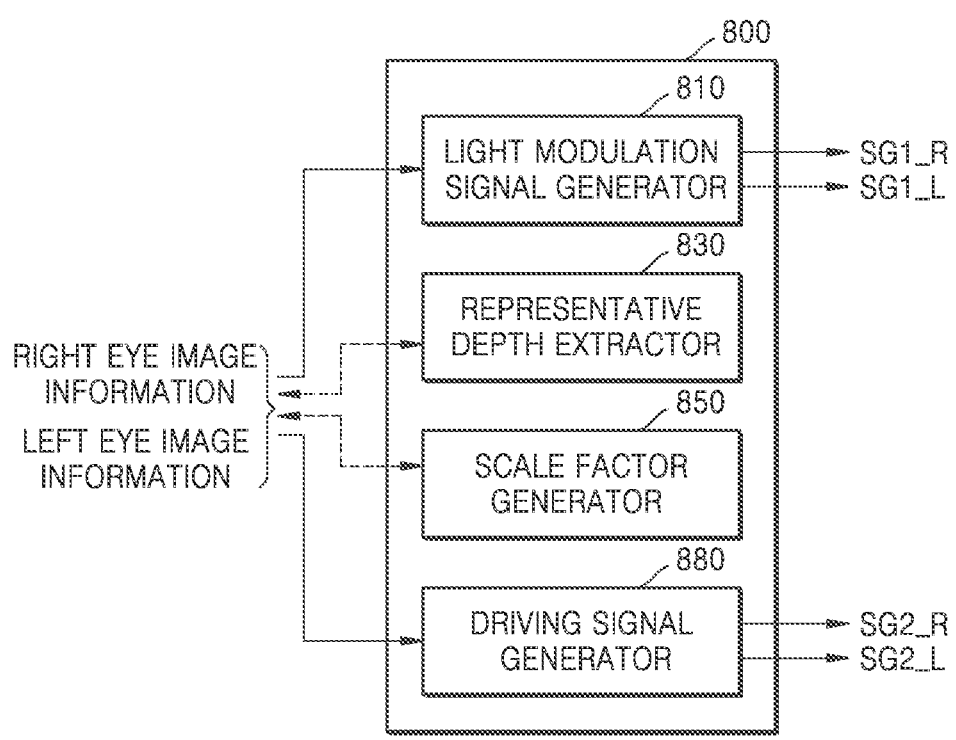
FIG. 13 is a block diagram illustrating an example of a configuration of a processor included in the image display apparatus of FIG. 12.

FIG. 12 illustrates a configuration and an optical arrangement of an image display apparatus 2000 according to another example embodiment. FIG. 13 is a block diagram illustrating an example of a configuration of a processor 800 included in the image display apparatus 2000 of FIG. 12.

The image display apparatus 2000 may include a first display device 160, a first driver 260, a first light transmitter 360, a second display device 170, a second driver 270, and a second light transmitter 370.

The first driver 260 and the second driver 270 drive positions of the first display device 160 and the second display device 170, respectively, and the first light transmitter 360 and the second light transmitter 370 transmit images formed by the first display device 160 and the second display device 170 to the left and right eyes of an observer, respectively.

The image display apparatus 2000 further includes the processor 800 and a memory 700. The processor 800 controls the first display device 160, the second display device 170, the first driver 260, and the second driver 270 according to image information stored in the memory 700. The processor 800 may include a light modulation signal generator 810 and a driving signal generator 880. Program codes for executing the light modulation signal generator 810 and the driving signal generator 880 may be stored in the memory 700.

The image information stored in the memory 700 may include information about a pair of a left eye image and a right eye image that may be perceived as 3D images of one frame. The left eye image and the right eye image have a predetermined disparity. The processor 800 generates light modulation signals SG1_L and SG1_R such that the left eye image is formed on the first display device 160 and the right eye image is formed on the second display device 170 and accordingly, controls the first display device 160 and the second display device 170.

The image information may further include depth information related to positions of the virtual image plane VP on which the left eye image and the right eye image are to be imaged, and the processor 800 generates driving signals SG2_L and SG2_R such that the virtual image plane VP is formed according to the depth information, that is, on a set depth position and controls the first driver 160 and the second driver 270.

The depth information may be previously set with respect to an image of each frame and stored in the memory 700, or the set depth information may be reflected to the image information according to execution of a representative depth extractor 830 included in the processor 800.

The processor 800 may also include a scale factor generator 850 in addition to the light modulation signal generator 810 and the representative depth extractor 830, and the driving signal generator 880.

The scale factor generator 850 differs only in generating a scale factor according to a change in the magnification between successive frame images with respect to left eye image information and right eye image information respectively provided for both eyes and is substantially the same as the scale factor generator 450 described with reference to FIGS. 4 and 5.

The image display apparatus 2000 according to the example embodiment may express a 3D image by combining a binocular disparity method and a depth expression. For an image including an object of a predetermined depth position, a vergence accommodation conflict (VAC) may be reduced by adjusting a position of the virtual image plane VP on which the image is imaged. In addition, an image in which objects are present at various depth positions may be formed on the virtual image plane VP, for example, using a depth position of a main object determined according to the salience map as the representative depth position, and the remaining sense of depth may be expressed in binocular parallax such that a 3D image may be perceived.

The image display apparatuses 1000 and 2000 described above may be configured in a wearable form. All or some of components of the image display apparatuses 1000 and 2000 may be configured in a wearable form.

For example, the image display apparatuses 1000 and 2000 may be applied in the form of a head mounted display (HMD). In addition, the image display apparatuses 1000 and 2000 are not limited thereto, and may be applied to a glasses-type display or a goggle-type display.

The image display apparatuses 1000 and 2000 described above may be applied to implement augmented reality (AR) in that both an image formed on a display device and an image of the real world may be shown to an observer.

The AR may further increase an effect of reality by showing a virtual object or information combined on an environment of the real world. For example, at a position of the observer, an image forming unit may form additional information about the environment provided by the real world and provide the additional information to the observer. An AR display may be applied to a ubiquitous environment or an internet of things (IoT) environment.

The image of the real world is not limited to a real environment, and may be, for example, an image formed by another image device. Accordingly, the image display apparatuses 1000 and 2000 described above may be applied to multi image display apparatuses that display two images together.

The image display apparatuses 1000 and 2000 described above may operate in synchronization with or in connection to other electronic devices such as a smart phone. For example, a processor for driving the image display apparatuses 1000 and 2000 may be provided in the smart phone. In addition, the image display apparatuses 1000 and 2000 described above may be provided in a smart phone.

The image display apparatuses described above may be capable of a wide range of depth expression in a compact structure.

The image display apparatuses described above may provide a 3D image combining a binocular disparity method and a depth expression.

The image display apparatuses described above may be easily applied to a wearable device, and may be applied to, for example, a glasses-type AR display apparatus, etc.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing example embodiments are merely exemplary and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An image display apparatus comprising:
a display device configured to modulate light to form an image;
a light transmitter comprising a focusing member and configured to change a direction of the light incident on the light transmitter to transmit the image to a preset location;
a driver that is in contact with the display device, and is configured to adjust a position of the display device disposed between the driver and the light transmitter, and
a processor configured to generate a driving signal according to image information and control the driver according to the driving signal, to adjust the position of the display device relative to the focusing member according to the driving signal.

2. The image display apparatus of claim 1, wherein the driver is further configured to move the display device in parallel such that a distance between the display device and the focusing member varies.

3. The image display apparatus of claim 1, wherein the driver comprises a shape-changing portion which is deformable according to an applied signal to provide a driving force to the display device.

4. The image display apparatus of claim 3, wherein the shape-changing portion comprises a material that has a shape varying by heat.

5. The image display apparatus of claim 3, wherein the shape-changing portion comprises a shape memory alloy or an electro active polymer.

6. The image display apparatus of claim 1, wherein the light transmitter is further configured to transmit the image as an enlarged image on a virtual image plane at a predetermined position.

7. The image display apparatus of claim 6, wherein the image information comprises depth information related to the predetermined position of the virtual image plane with respect to each of images of a plurality of frames, and
wherein the processor is further configured to generate the driving signal according to the depth information.

8. The image display apparatus of claim 7, wherein the depth information comprises information previously set from a saliency map with respect to each of the images of the plurality of frames.

9. An image display apparatus comprising:
a display device configured to modulate light to form an image;
a driver configured to adjust a position of the display device;
a light transmitter comprising a focusing member and configured to change a direction of the light incident on the light transmitter to transmit the image to a preset location; and
a processor configured to:
generate a driving signal according to image information and control the driver according to the driving signal, to adjust the position of the display device relative to the focusing member according to the driving signal;
generate a scale factor to be applied to any one of images of two successive frames with different depth information,
generate a light modulation signal by reflecting the scale factor to the image information, and
control the display device according to the light modulation signal.

10. The image display apparatus of claim 9, wherein the processor is further configured to
compute magnifications at which the images of the two successive frames are respectively imaged, and
set the scale factor to 1 when a change value between the magnifications is equal to or less than a predetermined reference value.

11. The image display apparatus of claim 9, wherein the processor is further configured to
compute magnifications at which the images of the two successive frames are respectively imaged, and
determine a similarity of the images of the two successive frames when a change value between the magnifications is larger than a predetermined reference value.

12. The image display apparatus of claim 11, wherein the processor is further configured to
set the scale factor to 1 when the similarity of the images of the two successive frames is equal to or less than the predetermined reference value, and
set the scale factor to an offset value that offsets the change value when the similarity of the images of the two successive frames is larger than the predetermined reference value.

13. The image display apparatus of claim 1, wherein the processor is further configured to, with respect to the image of a same frame, transmit the driving signal when a predetermined time elapses since a light modulation signal is transmitted.

14. The image display apparatus of claim 13, wherein the predetermined time is set to be equal to or greater than a predetermined convergence-accommodation time of an eye.

15. The image display apparatus of claim 1, wherein the light transmitter is further configured to combine a first light comprising a first image from the display device with a second light comprising a second image of a real environment and transmit a combination of the first light and the second light to the preset location.

16. The image display apparatus of claim 15, wherein the light transmitter comprises:
   a beam splitter disposed obliquely with respect to a traveling path of the first light and a traveling path of the second light, and
   the focusing member.

17. The image display apparatus of claim 16, wherein the beam splitter comprises a half mirror.

18. The image display apparatus of claim 1, wherein the display device comprises a first display device and a second display device,
   wherein the driver comprises a first driver and a second driver respectively configured to drive the first display device and the second display device such that positions of the first display device and the second display device vary, and
   wherein the light transmitter comprises a first light transmitter and a second light transmitter configured to transmit images formed by the first display device and the second display device to a preset left eye location and a preset right eye location, respectively.

19. The image display apparatus of claim 18, wherein the image is a three-dimensional (3D) image, and the image information comprises
   information about a pair of a left eye image and a right eye image to be perceived as the 3D image of one frame, and
   wherein the processor is further configured to control the first display device and the second display device such that the left eye image is formed by the first display device and the right eye image is formed by the second display device.

20. The image display apparatus of claim 19, wherein the image information further comprises
   depth information related to positions of a virtual image plane on which the left eye image and the right eye image are to be imaged, and
   wherein the processor is further configured to control the first driver and the second driver according to the depth information.

21. The image display apparatus of claim 18, wherein the image display apparatus is a wearable apparatus.

* * * * *